(12) United States Patent
Shin et al.

(10) Patent No.: US 8,827,786 B2
(45) Date of Patent: Sep. 9, 2014

(54) GAME DEVICE, METHOD OF CONTROLLING A GAME DEVICE, AND INFORMATION STORAGE MEDIUM

(75) Inventors: Hideyuki Shin, Minato-ku (JP); Seitaro Kimura, Kanagawa (JP); Hitoshi Otomo, Chiba (JP); Hidekazu Sekiguchi, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 510 days.

(21) Appl. No.: 12/732,667

(22) Filed: Mar. 26, 2010

(65) Prior Publication Data
US 2010/0248827 A1 Sep. 30, 2010

(30) Foreign Application Priority Data
Mar. 27, 2009 (JP) ................................. 2009-080620

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/40 | (2014.01) |

(52) U.S. Cl.
CPC ...................................... *A63F 13/10* (2013.01)
USPC .......... 463/4; 463/6; 463/36; 463/37; 463/40; 463/41; 463/42; 345/156

(58) Field of Classification Search
USPC ................... 463/4, 6, 40–42, 36, 37; 345/156
See application file for complete search history.

(56) References Cited

U.S. PATENT DOCUMENTS

| 6,966,831 B2* | 11/2005 | Miyaki et al. ..................... 463/1 |
| 7,454,619 B2* | 11/2008 | Smetters et al. ............... 713/171 |
| 2003/0032467 A1* | 2/2003 | Mayer et al. ....................... 463/4 |

FOREIGN PATENT DOCUMENTS

| JP | 2005-046280 A | 2/2005 |
| JP | 2005046280 A * | 2/2005 ............. A63F 13/10 |

* cited by examiner

*Primary Examiner* — Adetokunbo O Torimiro
(74) *Attorney, Agent, or Firm* — Sughrue Mion, PLLC

(57) ABSTRACT

A display control section displays, on a game screen, a whole or a part of a game space in which a plurality of objects are located. An update section updates a location state of the plurality of objects. A notification subject situation saving section stores, as a notification subject situation, a location state of the plurality of objects at a given time point in a notification subject situation storage. A notification control section executes notification output based on a result of comparison between the location state of the plurality of objects and the notification subject situation.

10 Claims, 7 Drawing Sheets

FIG.6

|  | GAME SITUATION DATA |
|---|---|
| 1 SECOND BEFORE | ———— |
| 2 SECONDS BEFORE | ———— |
| 3 SECONDS BEFORE | ———— |
| ... | ... |
| 29 SECONDS BEFORE | ———— |
| 30 SECONDS BEFORE | ———— |

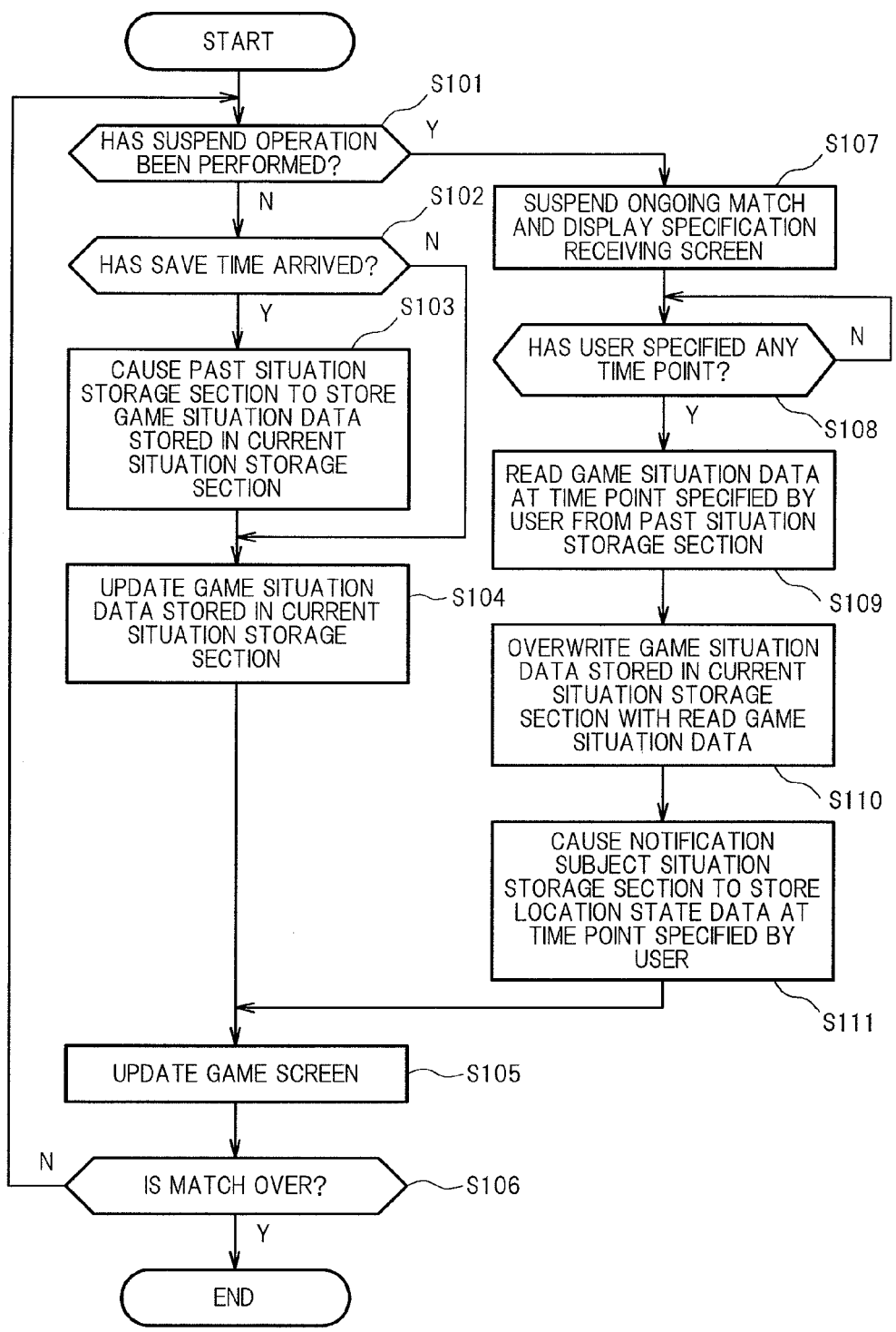

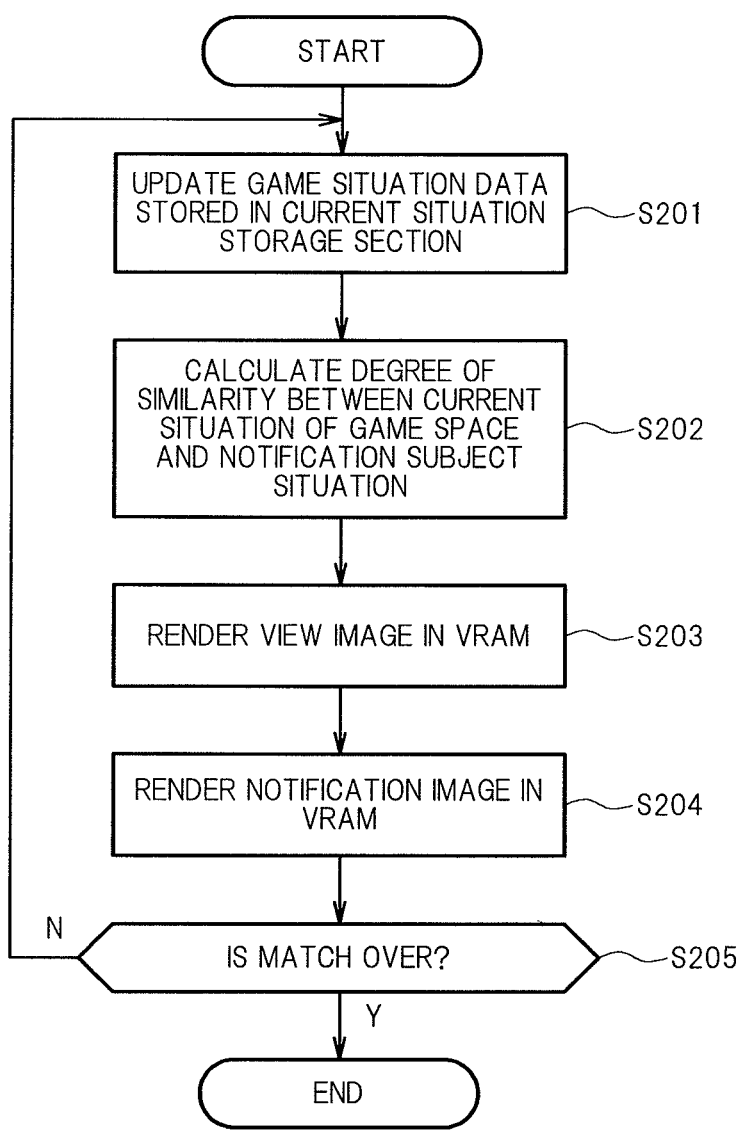

GAME DEVICE, METHOD OF CONTROLLING A GAME DEVICE, AND INFORMATION STORAGE MEDIUM

CROSS-REFERENCE TO RELATED APPLICATION

The present application claims priority from Japanese application JP 2009-080620 filed on Mar. 27, 2009, the content of which is hereby incorporated by reference into this application.

BACKGROUND OF THE INVENTION

1. Field of the Invention

The present invention relates to a game device, a method of controlling a game device, and an information storage medium.

2. Description of the Related Art

There is known a game device for displaying, on a game screen, the whole of or a part of a game space in which a plurality of objects are located. For example, in a game device for executing a sport game played using a moving object (for example, a ball or puck), the whole of or a part of the game space in which a plurality of objects corresponding to a plurality of players and an object corresponding to the moving object are located is displayed on the game screen.

Further, in some cases, such a game device as described above has a retry function (JP 2005-046280 A). The retry function is a function of returning a situation of the game space (for example, location state of a plurality of objects, or the like) to a previous situation (a situation at a time point in the past) and executing the game from that situation. This retry function enables the user to repeatedly practice playing the game from the previous situation.

SUMMARY OF THE INVENTION

In general, the user wishes to perform game operations by making use of their past experiences in a case where the situation of the game space (location state of a plurality of objects) has become a situation identical or similar to the situation that the user has experienced in the past. However, there has been a case in which the user does not notice that the situation of the game space has become a situation identical or similar to the situation that the user has experienced in the past.

For example, the user playing a soccer game wishes to perform such operations that would prevent giving up a goal by making use of their past experiences in a case where the situation of the match has become a situation identical or similar to the past situation of giving up a goal. However, there has been a case in which the user does not notice that the situation of the match has become a situation identical or similar to the past situation of giving up a goal.

Further, for example, the user who has practiced by utilizing the above-mentioned retry function wishes to make the most of the benefits obtained through the practice in a case where the situation of the game space has become a situation identical or similar to the situation that the user has practiced. However, there has been a case in which the user does not notice that the situation of the game space has become a situation identical or similar to the situation that the user has practiced.

The present invention has been made in view of the above-mentioned problems, and has an object to provide a game device, a method of controlling a game device, and an information storage medium, which are capable of making a user notice that a situation of a game space (location state of a plurality of objects) is identical or similar to a situation that a user has experienced in the past.

In order to solve the above-mentioned problems, a game device according to the present invention is a game device for executing a game. The game device includes: a display control section for displaying, on a game screen, a whole or a part of a game space in which a plurality of objects are located; an update section for updating a location state of the plurality of objects; a notification subject situation saving section for storing, as a notification subject situation, a location state of the plurality of objects of a given time point in a notification subject situation storage; and a notification control section for executing notification output based on a result of comparison between the location state of the plurality of objects and the notification subject situation.

Further, a method of controlling a game device according to the present invention is a method of controlling a game device for executing a game. The method includes: a display control step of displaying, on a game screen, a whole of or a part of a game space in which a plurality of objects are located; an update step of updating a location state of the plurality of objects; a notification subject situation saving step of storing, as a notification subject situation, a location state of the plurality of objects of a given time point in a notification subject situation storage; and a notification control step of executing notification output based on a result of comparison between the location state of the plurality of objects and the notification subject situation.

Further, a program according to the present invention is a program for causing a computer, such as a consumer game machine (stationary game machine), a portable game machine, an arcade game machine, a mobile phone, a personal digital assistant (PDA), or a personal computer, to function as a game device for executing a game. The program further causes the computer to function as: a display control section for displaying, on a game screen, a whole of or a part of a game space in which a plurality of objects are located; an update section for updating a location state of the plurality of objects; a notification subject situation saving section for storing, as a notification subject situation, a location state of the plurality of objects of a given time point in a notification subject situation storage; and a notification control section for executing notification output based on a result of comparison between the location state of the plurality of objects and the notification subject situation.

Further, an information storage medium according to the present invention is a computer-readable information storage medium storing the above-mentioned program.

According to the present invention, it is possible to make the user notice that the situation of the game space (location state of a plurality of objects) is identical or similar to the past situation that the user has experienced.

Further, according to one aspect of the present invention, the game device may further include a section for returning the location state of the plurality of objects to a previous location state and executing the game from a previous situation. In a case where the game is executed from the previous situation, the notification subject situation saving section may store, as the notification subject situation, the previous location state of the plurality of objects in the notification subject situation storage.

Further, according to another aspect of the present invention, the notification subject situation saving section may store, as the notification subject situation, a location state of the plurality of objects at a time point specified by a user in the notification subject situation storage.

Further, according to a further aspect of the present invention, in a case where a predetermined operation is performed, the notification subject situation saving section may store, as the notification subject situation, a location state of the plurality of objects at a time point based on a time point of performing the predetermined operation in the notification subject situation storage.

Further, according to a still further aspect of the present invention, in a case where a predetermined game event occurs, the notification subject situation saving section may store, as the notification subject situation, a location state of the plurality of objects at a time point that is before a time point of occurrence of the predetermined game event in the notification subject situation storage.

Further, according to a yet further aspect of the present invention, the notification control section may include: a section for acquiring a degree of similarity between the location state of the plurality of objects and the notification subject situation; and a section for executing the notification output based on the degree of similarity.

Further, according to a yet further aspect of the present invention, the display control section may display the game screen showing a situation of the game space, which is viewed from a virtual camera, on a display unit. The notification subject situation saving section may include a section for storing, in association with the notification subject situation, a setting state of the virtual camera at the given time point in a storage. The display control section may include a section for changing, in a case where the result of the comparison between the location state of the plurality of objects and the notification subject situation is a predetermined result, a setting state of the virtual camera based on the setting state of the virtual camera which has been stored in association with the notification subject situation.

BRIEF DESCRIPTION OF THE DRAWINGS

In the accompanying drawings:

FIG. 6 is a schematic diagram illustrating an example of storage contents of a past situation storage section;

FIG. 7 is a flow chart illustrating an example of processing to be executed by the game device; and FIG. 8 is a flow chart illustrating an example of processing to be executed by the game device.

DETAILED DESCRIPTION OF THE INVENTION

Hereinafter, detailed description is given of an example of an embodiment of the present invention with reference to the drawings. A game device according to the embodiment is implemented by, for example, a consumer game machine (stationary game machine), a portable game machine, a personal computer, a mobile phone, or a personal digital assistant (PDA). Herein, description is given of a case in which the game device according to the embodiment is implemented by a consumer game machine.

Figure 1:
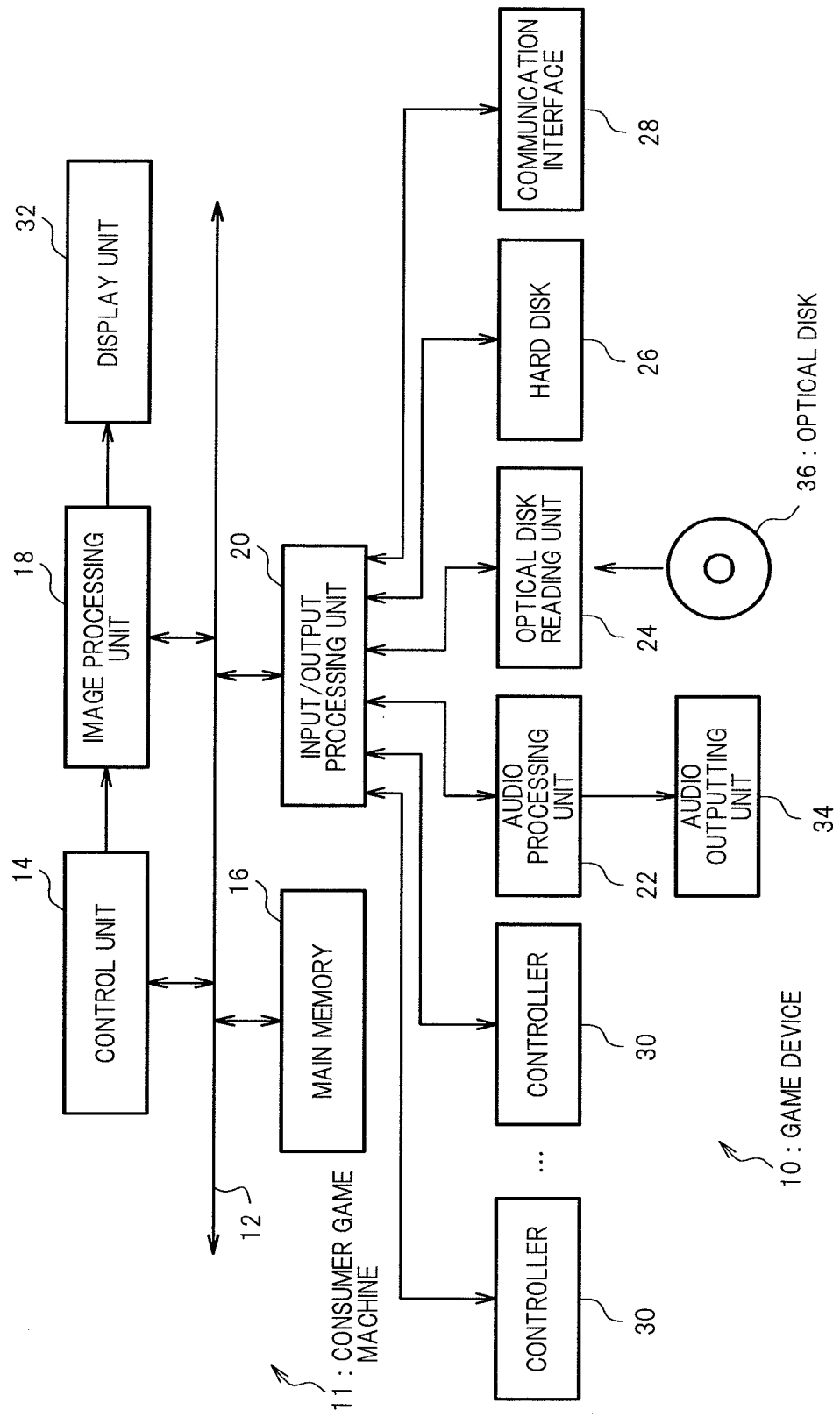
FIG. 1 is a diagram illustrating a hardware configuration of a game device according to an embodiment of the present invention.

FIG. 1 is a diagram illustrating a hardware configuration of a game device 10 according to this embodiment. As illustrated in FIG. 1, the game device 10 includes a consumer game machine 11, a display unit 32, an audio outputting unit 34, and an optical disk 36 (information storage medium). The display unit 32 is a display device such as a television set or a liquid crystal display, for example. The audio outputting unit 34 is an audio outputting device such as a speaker or headphones, for example.

The consumer game machine 11 is a computer game system. The consumer game machine 11 includes a bus 12, a control unit 14, a main memory 16, an image processing unit 18, an input/output processing unit 20, an audio processing unit 22, an optical disk reading unit 24, a hard disk 26, a communication interface 28, and a controller 30.

The control unit 14 includes one or a plurality of microprocessors. The control unit 14 executes various types of information processing based on an operating system stored in a ROM (not shown), or a program read from the optical disk 36. The main memory 16 includes, for example, a RAM. The program and data read from the optical disk 36 are written into the main memory 16 as necessary. The main memory 16 is also used as a working memory for the control unit 14.

The bus 12 is used for exchanging addresses and data among the components of the consumer game machine 11. The image processing unit 18 includes a VRAM, and based on image data supplied from the control unit 14, renders a game screen in the VRAM. Then, the image processing unit 18 converts the game screen rendered in the VRAM into video signals, and outputs the video signals to the display unit 32.

The input/output processing unit 20 is an interface for the control unit 14 to access the audio processing unit 22, the optical disk reading unit 24, the hard disk 26, the communication interface 28, and the controller 30. The audio processing unit 22 includes a sound buffer, and outputs, from the audio outputting unit 34, various types of audio data (for example, game music, game sound effects, dialogue, etc.) that have been loaded from the optical disk 36 into the sound buffer. The communication interface 28 is an interface for connecting the consumer game machine 11 to a communication network by wire or wireless.

The optical disk reading unit 24 reads a program or data recorded on the optical disk 36. Herein, the optical disk 36 is used for supplying the program or the data to the consumer game machine 11. Alternatively, another information storage medium, such as a memory card, may be used. Alternatively, the program or the data may be supplied to the consumer game machine 11 from a remote place via a communication network such as the Internet, for example. The hard disk 26 is a commonly-used hard disk device (auxiliary storage device). The program or the data, which is assumed to be stored in the optical disk 36 in the following description, may be stored in the hard disk 26.

The controller 30 is operation means for a user to perform various types of game operations. A plurality of the controllers 30 may be connected to the consumer game machine 11 by wire or wireless. The input/output processing unit 20 scans a state of the controller 30 at fixed intervals (for example, every $1/60^{th}$ of a second), and then transfers an operation signal indicating a result of the scanning to the control unit 14 via the bus 12. The control unit 14 performs judgment on the user's game operation based on the operation signal.

On the game device 10, for example, a soccer game simulating a soccer match between a team operated by the user (hereinafter, referred to as "user team") and a team operated by an opponent (hereinafter, referred to as "opponent team") is executed. The soccer game is implemented by executing a game program read from the optical disk 36.

Figure 2:
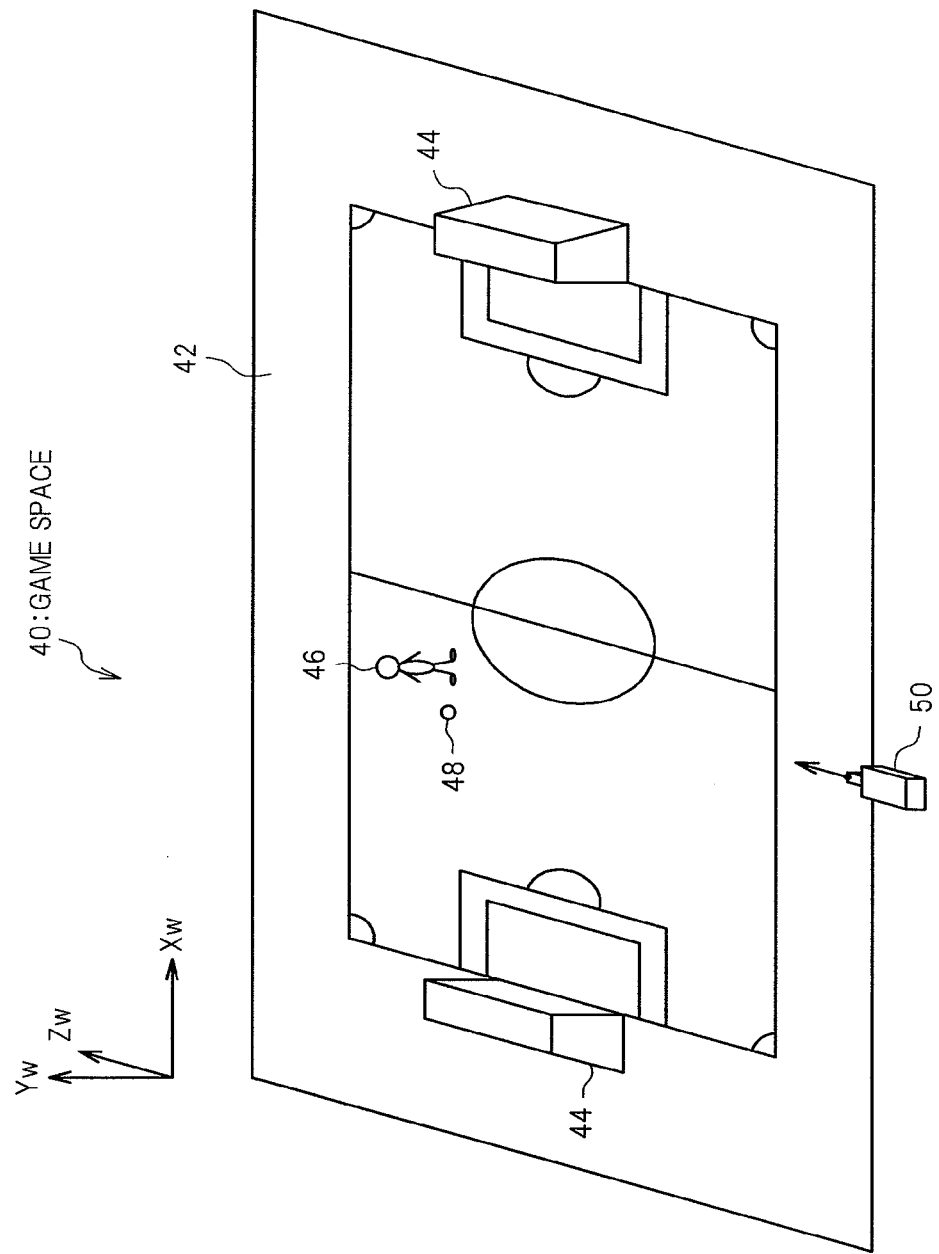
FIG. 2 is a diagram illustrating an example of a game space.

In order to display a game screen of the soccer game, a game space is built in the main memory 16. FIG. 2 is an example of the game space. A game space 40 illustrated in FIG. 2 is a virtual three-dimensional space. As illustrated in FIG. 2, a field 42, which is an object representing a soccer field, is located in the game space 40. Goals 44, which are objects representing soccer goals, a player character 46, which is an object representing a soccer player, and a ball 48, which is an object representing a soccer ball, are located on the field 42. Eleven player characters 46 belonging to the user team, and another eleven player characters 46 belonging to the opponent team are located on the field 42, but illustration thereof is omitted in FIG. 2. Here, the player characters 46 and the ball 48 are dynamic objects whose positions, postures, etc. change in the game space 40.

One of the goals 44 is associated with the user team, whereas the other one of the goals 44 is associated with the opponent team. When the ball 48 moves into the goal 44 associated with any one of the teams, a scoring event occurs for the other one of the teams.

Any one of a plurality of player characters 46 belonging to the user team is set as an operation subject of the user. The operation subject of the user is switched among the player characters 46 belonging to the user team based on, for example, the position of the ball 48 or the operation of the user. The player character 46 set as the operation subject of the user performs an action according to the operation of the user. On the other hand, player characters 46 that are not set as the operation subject of the user perform actions according to the operation of the computer.

When a player character 46 and the ball 48 come close to each other, the player character 46 and the ball 48 become associated with each other under a predetermined condition. In this case, the moving action of the player character 46 becomes a dribbling action. The state in which the ball 48 is associated with the player character 46 is hereinafter referred to as a state in which "the player character 46 is in possession of the ball 48".

In addition, a virtual camera 50 (viewpoint) is set in the game space 40. A game screen showing a situation of the game space 40, which is viewed from the virtual camera 50, is displayed on the display unit 32 (see FIG. 4 described later). For example, in order to constantly display the ball 48 on the game screen, the virtual camera 50 moves around within the game space 40 according to the position of the ball 48.

The game device 10 has two game modes, which are a normal mode and a practice mode. The normal mode is a mode for the user to enjoy playing a match against another user or the computer. In the normal mode, a match between the user team and the opponent team operated by another user or the computer is executed.

On the other hand, the practice mode is a mode for the user to practice with the game. The practice mode is similar to the normal mode in that a match between the user team and the opponent team operated by the computer is executed. However, the practice mode is different from the normal mode in that the practice mode has a retry function. Hereinafter, description is given of the retry function of the practice mode.

In the practice mode, during a match, data indicating a situation of the game is recorded at predetermined time intervals (for example, one second). As a result, during the match, the user can return the situation of the game to a previous situation, and can play the game again from that situation.

Figure 3:
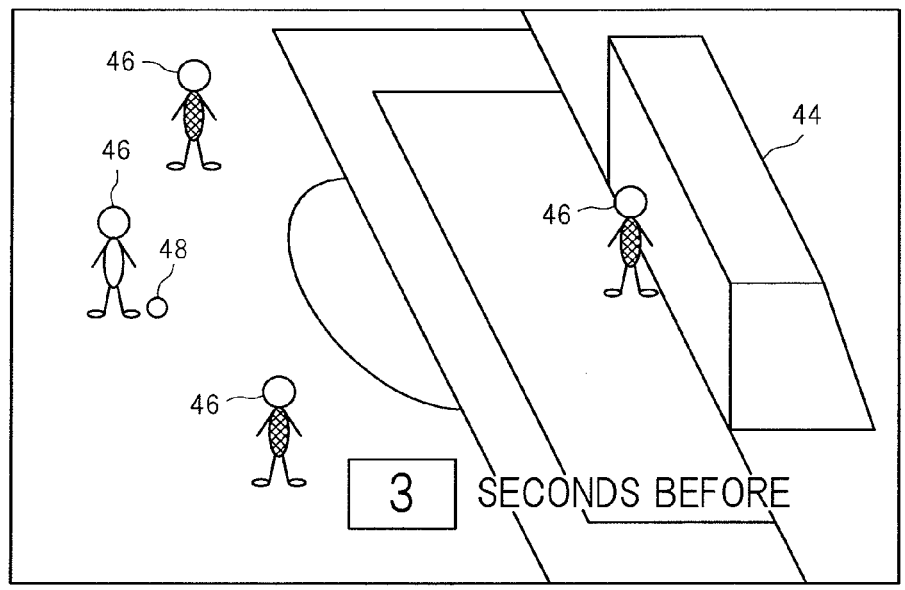
FIG. 3 is a diagram illustrating an example of a specification receiving screen.

When the user returns the situation of the game to a previous situation, the user performs an operation for temporarily suspending the ongoing game (match) (hereinafter, referred to as "suspend operation"). When the suspend operation has been performed, the ongoing match is temporarily suspended, and also, a screen for receiving specification about which time point the situation of the game is to be returned to (hereinafter, referred to as "specification receiving screen") is displayed. FIG. 3 is an example of the specification receiving screen. On this specification receiving screen, the user specifies how many seconds prior the situation of the game is to be returned to. When the user has specified a certain time point, the previous situation of the game specified by the user is replayed, and the game is resumed from that situation.

By utilizing the retry function described above, the user can repeatedly practice playing the game from a previous situation. For example, in a case where a scoring event for the opponent team has occurred, the user can repeatedly practice playing the game from a time point that is a short time before the time point of occurrence of the scoring event for the opponent team. In this case, the user can practice game operations for the defense. Further, for example, in a case where a scoring event for the operation subject team has occurred or in a case where a scoring event for the user team has not occurred despite a shot by a player character 46 belonging to the user team, the user can repeatedly practice playing the game from a time point that is a short time before the time point of such a case. In this case, the user can practice game operations for the offense.

Further, the game device 10 has a notification function as described below. The notification function is a function for making the user notice that the situation of the game space 40 (location state of the player characters 46 and the ball 48) has become a situation identical or similar to a situation that the user has practiced by utilizing the retry function.

In the practice mode, when the situation of the game is returned to a situation at the time point specified by the user and the game is executed from that situation, the situation of the game space 40 (location state of the player characters 46 and the ball 48) at the time point specified by the user is stored as a notification subject situation. Then, in the normal mode, the user is notified of whether or not the situation of the game space 40 has become a situation identical or similar to the notification subject situation.

Figure 4:
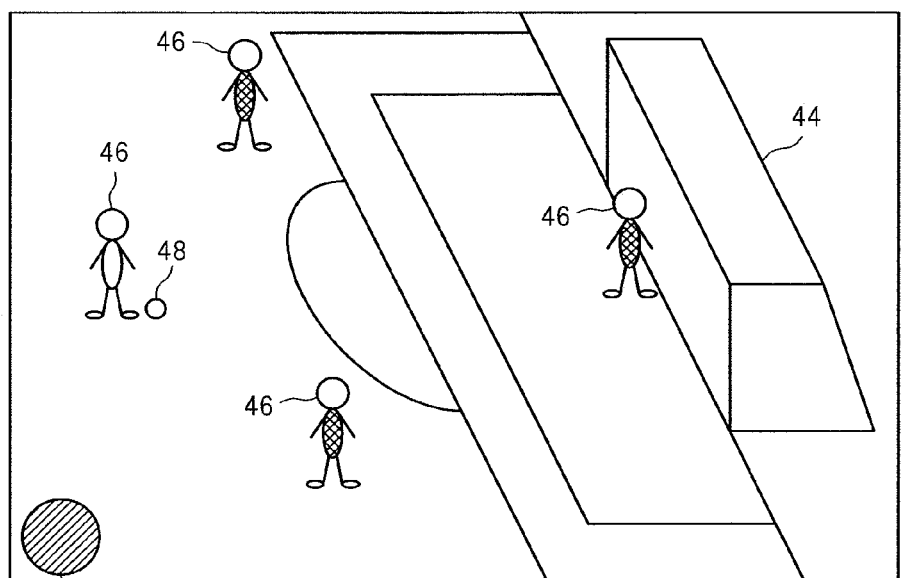
FIG. 4 is a diagram illustrating an example of a game screen.

FIG. 4 is an example of the game screen of the normal mode. As illustrated in FIG. 4, a notification image 52 is displayed on the game screen of the normal mode. The notification image 52 serves to notify the user of whether or not the current situation of the game space 40 (location state of the player characters 46 and the ball 48) has become a situation identical or similar to the notification subject situation. The color of the notification image 52 is set to a predetermined color (for example, red), and the color density of the notification image 52 is set to a color density corresponding to a degree of similarity between the current situation of the game space 40 and the notification subject situation. The color density of the notification image 52 becomes higher as the degree of similarity becomes higher. In the example illustrated in FIG. 4, the notification image 52 is a circular image, but the notification image 52 may be an image having a shape other than a circle.

Based on the color density of the notification image 52, the user can know whether or not the current situation of the game space 40 has become a situation identical or similar to the notification subject situation (situation that the user has practiced in the practice mode). Further, the user can know to what degree the current situation of the game space 40 is similar to the notification subject situation (situation that the user has practiced in the practice mode). Then, when the current situation of the game space 40 has become a situation identical or similar to the notification subject situation, the user can make the most of the benefits obtained through the practice in the practice mode.

Figure 5:
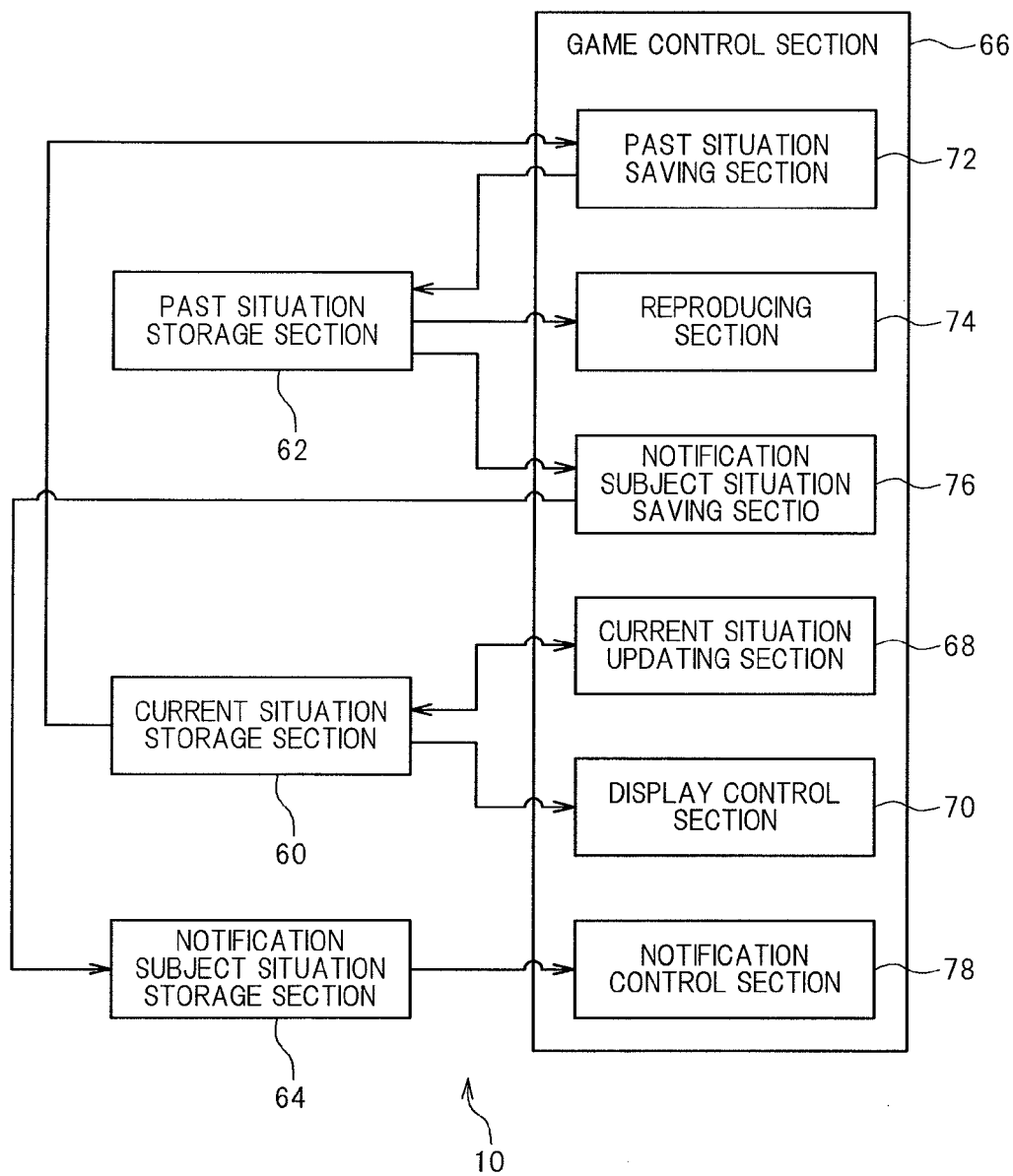
FIG. 5 is a functional block diagram illustrating an example of functional blocks implemented in the game device.

Here, description is given of a configuration relevant to the notification function. FIG. 5 is a functional block diagram illustrating an example of functional blocks implemented in the game device 10. The functional block diagram illustrated in FIG. 5 mainly illustrates the functional blocks relevant to the notification function. As illustrated in FIG. 5, the game device 10 includes a current situation storage section 60, a past situation storage section 62, a notification subject situation storage section 64, and a game control section 66.

The current situation storage section 60 and the past situation storage section 62 are mainly implemented by, for example, the main memory 16, whereas the notification subject situation storage section 64 is mainly implemented by, for example, the hard disk 26 (auxiliary storage unit). The game control section 66 is a functional block for executing game control in the normal mode and the practice mode, and is mainly implemented by, for example, the control unit 14. As illustrated in FIG. 5, the game control section 66 includes a current situation updating section 68 (update section), a display control section 70, a past situation saving section 72, a reproducing section 74, a notification subject situation saving section 76, and a notification control section 78.

The current situation storage section 60, the current situation updating section 68, and the display control section 70 are functional blocks common to both the normal mode and the practice mode.

The current situation storage section 60 stores data indicating the current situation of the game. For example, the data indicating the situation of the game contains such data as follows:
(A) data indicating the situation of the game space 40;
(B) data indicating the setting state (for example, position, direction of sight, etc.) of the virtual camera 50;
(C) data indicating the scores of both the teams; and
(D) data indicating an elapsed time.

The data (A) indicating the situation of the game space 40 is data related to the location state of dynamic objects located in the game space 40. In this embodiment, the player characters 46 and the ball 48 correspond to the dynamic objects, and hence the data indicating the situation of the game space 40 contains such data as follows:
(A-1) data indicating the location state (for example, position, orientation, posture, moving direction, etc.) of each player character 46; and
(A-2) data indicating the location state (for example, position, moving direction, etc.) of the ball 48.

It should be noted that the data (A-1) indicating the location state of the player characters 46 also contains data indicating whether or not a player character 46 is in possession of the ball 48, and data indicating whether or not a player character 46 is set as the operation subject of the user, for example.

Further, hereinafter, the data (A to D) indicating the situation of the game is referred to as "game situation data". Further, the data (A) indicating the situation of the game space 40, that is, the data (A-1 and A-2) related to the location state of the dynamic objects located in the game space 40 is referred to as "location state data".

The current situation updating section 68 updates the game situation data stored in the current situation storage section 60, thereby updating the current situation of the game. For example, the current situation updating section 68 updates the location state (for example, positions, etc.) of the player characters 46 and the ball 48. Detailed description of operation of the current situation updating section 68 is given later (see S104 of FIG. 7).

The display control section 70 displays the whole of or apart of the game space 40 on the game screen of the display unit 32. In this embodiment, the display control section 70 generates a game screen showing the situation of the game space 40, which is viewed from the virtual camera 50, based on the game situation data stored in the current situation storage section 60, and then displays the game screen on the display unit 32.

The past situation storage section 62, the past situation saving section 72, and the reproducing section 74 are functional blocks relevant to the practice mode (retry function). Further, the notification subject situation storage section 64, the notification subject situation saving section 76, and the notification control section 78 are functional blocks relevant to the notification function.

The past situation storage section 62 stores data indicating the previous situation of the game. In this embodiment, the past situation storage section 62 stores the game situation data for each of a plurality of past time points. FIG. 6 is a schematic diagram illustrating an example of the storage contents of the past situation storage section 62. In the example illustrated in FIG. 6, the game situation data is stored at predetermined time intervals (for example, one second) during a period ranging from a predetermined period of time (for example, thirty seconds) before to the current time point.

At predetermined time intervals (for example, one second), the past situation saving section 72 stores the game situation data of the current time point in the past situation storage section 62. In this embodiment, at predetermined time intervals (for example, one second), the past situation saving section 72 copies the game situation data stored in the current situation storage section 60 to the past situation storage section 62.

The reproducing section 74 reproduces the previous situation of the game based on the storage contents of the past situation storage section 62, and resumes the game from that situation. In this embodiment, the reproducing section 74 returns the situation of the game to a previous situation specified by the user, and executes the game from that situation. Detailed description of operation of the reproducing section 74 is given later (see S107 to S110 of FIG. 7).

The notification subject situation saving section 76 stores, in the notification subject situation storage section 64, the situation of the game space 40 (location state of the player characters 46 and the ball 48) of a given time point as the notification subject situation. It should be noted that the notification subject situation storage section 64 stores one or a plurality of notification subject situations.

When the situation of the game is returned to the previous situation by the reproducing section 74, the notification subject situation saving section 76 of this embodiment stores, in the notification subject situation storage section 64, the previous location state data as data indicating the notification subject situation (hereinafter, referred to as "notification subject situation data"). For example, when the situation of the game is returned to the situation at a time point of 10 seconds before by the reproducing section 74, the location state data at the time point of 10 seconds before is stored in the notification subject situation storage section 64 as the notification subject situation data.

It should be noted that the notification subject situation saving section 76 may store, in the notification subject situation storage section 64, only a part of the previous location state data as the notification subject situation data. The notification subject situation storage section 64 may store only information necessary for judging whether or not the situation of the game space 40 is a situation identical or similar to the notification subject situation. For example, only data indicating the previous positions of the player characters 46 and the ball 48 may be stored in the notification subject situation storage section 64.

Incidentally, as described above, the reproducing section 74 returns the situation of the game to the previous situation specified by the user. Hence, it may be said that the notification subject situation saving section 76 stores, as the notification subject situation, the situation of the game space 40 (location state of the player characters 46 and the ball 48) at the time point specified by the user in the notification subject situation storage section 64.

The notification control section 78 is a functional block that is enabled only in the normal mode. The notification control section 78 executes notification output based on a result of comparison between the current situation of the game space 40 (current location state of the player characters 46 and the ball 48) and the notification subject situation. The "notification output" includes, for example, issuing notification through display output on the display unit 32, issuing notification through audio output from the audio outputting unit 34, and issuing notification through vibration output from the controller 30.

For example, the notification control section 78 may determine whether or not to execute the notification output based on the comparison result. More specifically, if the comparison result is a predetermined result, the notification control section 78 may execute the notification output. Further, for example, the notification control section 78 may set the mode of the notification output based on the comparison result.

In this embodiment, the notification control section 78 displays the notification image 52 on the game screen based on the degree of similarity between the current situation of the game space 40 (current location state of the player characters 46 and the ball 48) and the notification subject situation (see FIG. 4). More specifically, the notification control section 78 sets the display mode for the notification image 52 to be displayed on the game screen based on the degree of similarity. In this embodiment, the color density of the notification image 52 is set based on the degree of similarity. Detailed description of operation of the notification control section 78 is given later (see S202 and S204 of FIG. 8).

It should be noted that the color, content, pattern, transparency, shape, size, or position of the notification image 52 may be set based on the degree of similarity. The notification image 52 may be an image showing a numerical value, characters, or a mark, which indicates the degree of similarity.

Further, only if the degree of similarity is equal to or higher than a predetermined reference degree of similarity, the notification control section 78 may display the notification image 52 on the game screen. In this manner, only if the current situation of the game space 40 (current location state of the player characters 46 and the ball 48) and the notification subject situation are identical or similar to each other, the notification image 52 may be displayed on the game screen.

Further, instead of displaying the notification image 52, the notification control section 78 may set the color of the entire game screen based on the degree of similarity. For example, the entire game screen may be become more reddish as the degree of similarity becomes higher.

Further, instead of displaying the notification image 52, the notification control section 78 may control the virtual camera 50 based on the degree of similarity. With this configuration, an area within the game space, which is displayed on the game screen, may be change based on the degree of similarity.

For example, the notification control section 78 may control a distance from the field 42 to the virtual camera 50 based on the degree of similarity. By doing so, the width (size) of the area within the game space, which is displayed on the game screen, may change based on the degree of similarity. For example, if the degree of similarity is relatively high, the position of the virtual camera 50 may be controlled so that the distance from the field 42 to the virtual camera 50 becomes longer compared to a case in which the degree of similarity is low. Then, as a result, in a case where the degree of similarity is relatively high, a wider area is displayed on the game screen compared to the case in which the degree of similarity is low.

Further, for example, if the degree of similarity is higher than the predetermined reference degree of similarity, the notification control section 78 may control the virtual camera 50 so that the goal(s) 44 of the operation subject team and/or the opponent team are/is displayed on the game screen.

Further, in the case where the notification control section 78 causes the audio outputting unit 34 to output audio, the type, output volume, or pitch of the audio may be set based on the degree of similarity. Further, in a case where the notification control section 78 causes the controller 30 to vibrate, the mode (for example, strength) of the vibration may be set based on the degree of similarity.

Next, description is given of processing to be executed by the game device 10 to implement the game control section 66. FIGS. 7 and 8 are flow charts each illustrating an example of the processing to be executed by the game device 10.

FIG. 7 illustrates processing to be executed in the practice mode. As illustrated in FIG. 7, the control unit 14 judges whether or not the suspend operation has been performed based on an operation signal input from the controller 30 (S101).

If it is judged that the suspend operation has not been performed, the control unit 14 (past situation saving section 72) judges whether or not a save time has arrived (S102). The "save time" means a time at which the game situation data is to be saved into the past situation storage section 62. For example, the save time comes at predetermined time intervals (for example, one second).

If it is judged that the save time has arrived, the control unit 14 (past situation saving section 72) stores, in the past situation storage section 62, the game situation data stored in the current situation storage section 60 (S103). Here, in a case where a predetermined number of pieces (for example, 30 pieces) of game situation data have already been stored in the past situation storage section 62, the oldest piece of the game situation data is deleted from the past situation storage section 62, and then the game situation data, which is stored in the current situation storage section 60, is stored in the past situation storage section 62.

In a case where the processing of Step S103 has been executed, or in a case where it is judged in Step S102 that the save time has not arrived, the control unit 14 (current situation updating section 68) updates the game situation data stored in the current situation storage section 60 (S104).

In Step S104, the situation of the game space 40 is updated by, for example, updating the location state data. Specifically, the location state (for example, position, orientation, etc.) of the player character 46 set as the operation subject of the user is updated based on the operation content of the user. Further, for example, the location states (for example, positions, orientations, etc.) of the player characters 46 that are not set as the operation subject of the user are updated according to a behavior control algorithm. Further, for example, the location state (for example, position, etc.) of the ball 48 is updated.

On the other hand, if it is judged in Step S101 that the suspend operation has been performed, the control unit 14 (reproducing section 74) temporarily suspends the ongoing match, and then displays the specification receiving screen (see FIG. 3) on the display unit 32 (S107). After that, the control unit 14 (reproducing section 74) monitors whether or not the user has specified any time point within a period ranging from a predetermined period of time (for example, thirty seconds) before to the current time point on the specification receiving screen (S108).

If the user has specified a time point on the specification receiving screen, the control unit 14 (reproducing section 74, notification subject situation saving section 76) reads the game situation data at the time point specified by the user from the past situation storage section 62 (S109). Here, in this case, pieces of the game situation data of the subsequent time points after the time point specified by the user are deleted from the past situation storage section 62.

Further, the control unit 14 (reproducing section 74) overwrites the game situation data stored in the current situation storage section 60 with the game situation data read in Step S109 (S110). In this case, the current situation of the game is returned to the situation at the time point specified by the user. As a result, the game is resumed from the situation at the time point specified by the user.

After that, the control unit 14 (notification subject situation saving section 76) acquires the location state data at the time point specified by the user, based on the game situation data read in Step S109, and then stores that location state data as the notification subject situation data in the notification subject situation storage section 64 (S111).

After the processing of Step S104 or S111 is executed, the control unit 14 (display control section 70) updates the game screen (S105). In the processing of Step S105, a game screen showing a situation of the game space 40, which is viewed from the virtual camera 50, is generated in the VRAM based on the game situation data stored in the current situation storage section 60. Then, the game screen generated in the VRAM is displayed on the display unit 32.

After that, the control unit 14 (game control section 66) judges whether or not the match is over (S106). If the match is not over, the processing of Step S101 is executed again. It should be noted that unless the suspend operation is performed or the match is over, the processing from Steps S101 to S106 is repeatedly executed at predetermined time intervals (for example, $1/60^{th}$ of a second). On the other hand, if the match is over, this processing is ended. It should be noted that if the match is over, a screen showing the result of the match is displayed on the display unit 32, but description thereof is omitted in FIG. 7.

FIG. 8 illustrates processing to be executed in the normal mode. As illustrated in FIG. 8, the control unit 14 (current situation updating section 68) updates the game situation data stored in the current situation storage section 60 (S201). The processing of Step S201 is the same as the processing of Step S104 of FIG. 7.

After that, the control unit 14 (notification control section 78) calculates the degree of similarity between the current situation of the game space 40 (current location state of the player characters 46 and the ball 48) and the notification subject situation based on the storage contents of the current situation storage section 60 and the notification subject situation storage section 64 (S202). For example, the degree of similarity is calculated by making comparison between the current situation and the notification subject situation with regard to the positions, orientations, etc. of the player characters 46 belonging to the user team, the positions, orientations, etc. of the player characters 46 belonging to the opponent team, and the position, etc. of the ball 48.

After that, based on the game situation data stored in the current situation storage section 60, the control unit 14 (display control section 70) renders, in the VRAM, a view image showing a situation of the game space 40 which is viewed from the virtual camera 50 (S203). Further, the control unit 14 (display control section 70) renders the notification image 52 at a predetermined position of the view image generated on the VRAM (S204). In this case, the color density of the notification image 52 is set to a color density corresponding to the degree of similarity calculated in Step S202. Through the processing of Steps S203 and S204, the game screen (see FIG. 4) is generated on the VRAM. The game screen generated on the VRAM is displayed on the display unit 32. In this manner, the game screen is updated.

After that, the control unit 14 (game control section 66) judges whether or not the match is over (S205). If the match is not over, the processing of Step S201 is executed again. It should be noted that unless the match is over, the processing from Steps S201 to S205 is repeatedly executed at predetermined time intervals (for example, $1/60$ seconds). On the other hand, if the match is over, this processing is ended. It should be noted that when the match is over, a screen showing the result of the match is displayed on the display unit 32, but description thereof is omitted in FIG. 8.

The game device 10 described above has the notification function. With this notification function (notification image 52), it becomes possible to let the user know whether or not the current situation of the game space 40 (current location state of the player characters 46 and the ball 48) has become a situation identical or similar to the situation that the user has practiced in the practice mode (situation that the user has experienced in the past). As a result, the user can make the most of the benefits obtained through the practice with more ease.

In particular, in the soccer game, a plurality of player characters 46 can freely move around within the game space 40. Hence, it is extremely difficult for the user to know whether or not the current situation of the game space 40 (current location state of the player characters 46 and the ball 48) is identical or similar to the situation that the user has practiced in the practice mode. Further, in the soccer game, there may be a case in which only a part of the game space 40 is displayed on the game screen. In such a case, it is even more difficult for the user to know whether or not the current situation of the game space 40 is identical or similar to the situation that the user has practiced in the practice mode. In this respect, because the game device 10 has the notification function, it is possible to let the user know whether or not the current situation of the game space 40 (current location state of the player characters 46 and the ball 48) is identical or similar to the situation that the user has practiced in the practice mode even in a game in which a plurality of player characters 46 can freely move around within the game space 40 and a game in which only a part of the game space 40 is displayed on the game screen.

It should be noted that the present invention is not limited to the foregoing embodiment.

(1) For example, in a case where the degree of similarity between the current situation of the game space 40 (current location state of the player characters 46 and the ball 48) and the notification subject situation is equal to or higher than the predetermined reference degree of similarity, the display control section 70 may change the current setting state of the virtual camera 50 to a setting state of the virtual camera 50 of the notification subject situation.

With this configuration, in a case where the current situation of the game space 40 (current location state of the player characters 46 and the ball 48) is identical or similar to the situation that the user has practiced in the practice mode, the setting state of the virtual camera 50 is changed to a setting state obtained at the time of practice in the practice mode. Specifically, on the game screen, a situation of the game space 40, which is viewed from the virtual camera 50 at the time of practice in the practice mode, is displayed. According to this modification example, it becomes possible for the user to play the game on a game screen viewed from the same camera angle as in the case of practice in the practice mode. As a result, it becomes possible for the user to make the most of the benefits obtained through the practice in the practice mode.

Here, the notification subject situation saving section 76 of this modification example stores, as the notification subject situation data, the location state data indicating the situation of the game space 40 (location state of the player characters 46 and the ball 48) of a given time point in the notification subject situation storage section 64. At the same time, the notification subject situation saving section 76 of this modification example stores, in association with the notification subject situation data, the setting state data indicating the setting state of the virtual camera 50 of the given time point in a storage section (for example, notification subject situation storage section 64).

Then, in a case where the result of comparison between the current situation of the game space 40 (current location state of the player characters 46 and the ball 48) and a notification subject situation is a predetermined result, the display control section 70 of this modification example sets the setting state of the virtual camera 50 based on the setting state of the virtual camera 50, which has been stored in association with that notification subject situation. For example, in a case where the degree of similarity between the current situation of the game space 40 (current location state of the player characters 46 and the ball 48) and a notification subject situation is equal to or higher than the reference degree of similarity, the current setting state of the virtual camera 50 is updated to the setting state indicated by the setting state data of the virtual camera 50, which has been stored in association with the notification subject situation data.

(2) Further, for example, the normal mode may have the functions (retry function and save function for the notification subject situation) provided to the practice mode. Further, in this case, the practice mode may be omitted.

(3) Further, for example, in a case where the user has performed a predetermined operation during the game (match) in the normal mode or the practice mode, the notification subject situation saving section 76 may store, as the notification subject situation, the situation of the game space 40 (location state of the player characters 46 and the ball 48) at a time point based on the time point of performing the predetermined operation in the notification subject situation storage section 64.

In this manner, the user may perform the predetermined operation to register the current situation of the game space 40 (current location state of the player characters 46 and the ball 48) as the notification subject situation.

Here, the "predetermined operation" is, for example, an operation of depressing a predetermined button of the controller 30. Further, the "predetermined operation" may be, for example, an operation of depressing a button (for example, shot button) for giving a player character 46 an instruction to perform a predetermined action (for example, shot). With this configuration, the situation of the game space 40 at the time point at which the user gives a player character 46 an instruction to perform the predetermined action (for example, shot) is stored as the notification subject situation.

Further, the "time point based on the time point of performing the predetermined operation" may be, for example, the exact time point of performing the predetermined operation, or may also be a time point that has a fixed relation with the time point of performing the predetermined operation. Further, the "time point that has a fixed relation with the time point of performing the predetermined operation" is, for example, a time point that is a predetermined time (for example, one second, three seconds, or the like) before or after the time point of performing the predetermined operation.

Here, in a case where the user is allowed to perform a plurality of types of operations as the above-mentioned predetermined operation, the "time point based on the time point of performing the predetermined operation" may be changed depending on which operation the user has performed among the plurality of types of operations. For example, in a case where an operation of depressing a first button of the controller 30 and an operation of depressing a second button of the controller 30 each correspond to the above-mentioned predetermined operation, the following configuration may be employed. That is, in a case where the first button is depressed, the "time point based on the time point of performing the predetermined operation" is set as a time point that is one second before the time point of performing the predetermined operation. In a case where the second button is depressed, the "time point based on the time point of performing the predetermined operation" is set as a time point that is three seconds before the time point of performing the predetermined operation.

(4) Further, for example, in a case where a predetermined game event has occurred during the game (match) in the normal mode or the practice mode, the notification subject situation saving section 76 may store, as the notification subject situation, the situation of the game space 40 (location state of the player characters 46 and the ball 48) at a time point that is before the time point of occurrence of the game event in the notification subject situation storage section 64.

Here, the "predetermined game event" is, for example, a scoring event for the opponent team. In this case, the notification subject situation saving section 76 causes the notification subject situation storage section 64 to store, as the notification subject situation, the situation of the game space 40 (location state of the player characters 46 and the ball 48) at a time point that is a predetermined time (for example, five seconds) before the time point of occurrence of the scoring event for the opponent team.

Further, the "predetermined game event" may also be, for example, a scoring event for the operation subject team. Specifically, the notification subject situation saving section 76 may store, as the notification subject situation, the situation of the game space 40 (location state of the player characters 46 and the ball 48) at a time point that is a predetermined time (for example, five seconds) before the time point of occurrence of the scoring event for the operation subject team in the notification subject situation storage section 64.

Further, the "predetermined game event" may also be, for example, a game event other than the scoring events for the opponent team and the operation subject team. For example, the "predetermined game event" may also be an offside event, which is a game event indicating that the operation subject team has violated the offside rule, or other events.

The "situation of the game space 40 at a time point that is before the time point of occurrence of the predetermined game event" may be regarded as a situation having a high possibility that the predetermined game event will occur in the near future. In this respect, according to this modification example, it is possible to let the user know whether or not the situation of the game space (location state of the player characters 46 and the ball 48) has become a situation having a high possibility that the predetermined game event will occur in the near future.

(5) Further, for example, the notification subject situation saving section 76 may store, in association with the notification subject situation, information indicating a type of notification subject situation in the notification subject situation storage section 64. The "information indicating a type of notification subject situation" includes, for example, information indicating whether or not the notification subject situation is a situation advantageous for the user (operation subject team) and information indicating whether or not the notification subject situation is a situation disadvantageous for the user (operation subject team).

Further, the notification control section 78 may execute the notification output based on the type of notification subject situation and the result of the comparison between the current situation of the game space 40 (current location state of the player characters 46 and the ball 48) and the notification subject situation. For example, the notification control section 78 may set the mode of the notification output based on the type of notification subject situation. For example, the mode (for example, color etc.) of the notification image 52 may be changed based on the type of notification subject situation. With this configuration, it becomes possible to let the user know whether or not the current situation of the game space 40 has become a situation identical or similar to the notification subject situation. At the same time, it also becomes possible to let the user know the type of notification subject situation.

Here, the type of notification subject situation may be set according to the operation (operation specifying the type of notification subject situation) performed by the user, or may be set by automatic judgment. For example, in the case of the above-mentioned modification example (4), the type of notification subject situation may be judged based on the type of game event. For example, in the case where the game event is a game event advantageous for the user (operation subject team) (for example, a scoring event for the operation subject team, or the like), the type of notification subject situation may be set as a "situation advantageous for the user (operation subject team)". On the other hand, in the case where the game event is a game event disadvantageous for the user (operation subject team) (for example, a scoring event for the opponent team, or the like), the type of notification subject situation may be set as a "situation disadvantageous for the user (operation subject team)".

(6) Further, for example, the notification subject situation saving section 76 may store, as the notification subject situation, the situation of the game space 40 (location state of the player characters 46 and the ball 48) of a given period of time in the notification subject situation storage section 64.

(7) Further, the present invention is also applicable to a sports game other than the soccer game. For example, the present invention is also applicable to a basketball game, an American football game, a baseball game, or a tennis game, which are played using a ball (moving object), or an ice hockey game that is played using a puck (moving object). It should be noted that a plurality of dynamic objects corresponding to a plurality of players and a dynamic object corresponding to a moving object (ball, puck, or the like) are located in a game space of this case. Further, for example, the present invention is applicable to a racing game in which a plurality of automobiles compete in a race. It should be noted that in a game space of this case, there are disposed a plurality of dynamic objects corresponding to the plurality of automobiles.

Further, the present invention is also applicable to a game other than the sports game. For example, the present invention is applicable to a game in which a plurality of game characters fight against each other. It should be noted that a plurality of dynamic objects corresponding to the plurality of game characters are located in a game space of this case.

Further, the present invention is also applicable to a network game executed via a communication network.

(8) Further, for example, the game space may be a virtual two-dimensional space. Specifically, the position etc. of a dynamic object located in the game space may be managed by two coordinate elements.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game, comprising:
a display control section for displaying, on a game screen, a whole or a part of a game space in which a plurality of objects are located;
an update section for updating a location state of the plurality of objects;
a notification subject situation saving section for storing, as a notification subject situation, the location state of the plurality of objects at a previous given time point during a practice mode in a notification subject situation storage; and
a notification control section for executing notification output during a normal mode based on a result of comparison between the location state of the plurality of objects in the normal mode and the notification subject situation that is stored in the practice mode, so as to provide an indication of a current game situation that is similar or identical to the notification subject situation that is stored in the practice mode,
wherein the display control section displays the game screen showing a situation of the game space, which is viewed from a virtual camera, on a display unit;
the notification subject situation saving section comprises a section for storing, in association with the notification subject situation, a setting state of the virtual camera at the previous given time point in a storage; and
the display control section comprises a section for changing, in a case where the result of the comparison between the location state of the plurality of objects and the notification subject situation is a predetermined result, a setting state of the virtual camera based on the setting state of the virtual camera which has been stored in association with the notification subject situation.

2. The game device according to claim 1, further comprising a section for returning the location state of the plurality of objects to a previous location state and executing the game from a previous situation,
  wherein, in a case where the game is executed from the previous situation, the notification subject situation saving section stores, as the notification subject situation, the previous location state of the plurality of objects in the notification subject situation storage.

3. The game device according to claim 1, wherein the notification subject situation saving section stores, as the notification subject situation, the location state of the plurality of objects at a time point specified by a user in the notification subject situation storage.

4. The game device according to claim 1, wherein, in a case where a predetermined operation is performed, the notification subject situation saving section stores, as the notification subject situation, the location state of the plurality of objects at a time point based on a time point of performing the predetermined operation, in the notification subject situation storage.

5. The game device according to claim 1, wherein, in a case where a predetermined game event occurs, the notification subject situation saving section stores, as the notification subject situation, the location state of the plurality of objects at a time point that is before a time point of occurrence of the predetermined game event in the notification subject situation storage.

6. A game device for executing a game, comprising:
  a display control section for displaying, on a game screen, a whole or a part of a game space in which a plurality of objects are located;
  an update section for updating a location state of the plurality of objects;
  a notification subject situation saving section for storing, as a notification subject situation, the location state of the plurality of objects at a previous given time point in a notification subject situation storage; and
  a notification control section for executing notification output based on a result of comparison between the location state of the plurality of objects and the notification subject situation,
  wherein the notification control section comprises:
  a section for acquiring a degree of similarity between the location state of the plurality of objects and the notification subject situation; and
  a section for executing the notification output based on the degree of similarity,
  wherein the notification output by the notification control section comprises controlling a distance from a field object to a virtual camera object to increase in accordance with an increase in the degree of similarity.

7. A method of controlling a game device comprising a processor and a display for executing a game, comprising:
  a display control step of displaying, on a game screen in the display, a whole or a part of a game space in which a plurality of objects are located;
  an update step of updating by the processor a location state of the plurality of objects;
  a notification subject situation saving step of storing, as a notification subject situation, the location state of the plurality of objects at a previous given time point during a practice mode in a storage; and
  a notification control step of executing notification output in the processor during a normal mode based on a result of comparison between the location state of the plurality of objects in the normal mode and the notification subject situation that is stored during the practice mode, so as to provide an indication of a current game situation that is similar or identical to the notification subject situation that is stored during the practice mode,
  wherein the display control step comprises a step of displaying the game screen
  showing a situation of the game space, which is viewed from a virtual camera, on a display unit;
  the notification subject situation saving step comprises a step of storing, in association with the notification subject situation, a setting state of the virtual camera at the previous given time point in a storage; and
  the display control step comprises a step of changing, in a case where the result of the comparison between the location state of the plurality of objects and the notification subject situation is a predetermined result, a setting state of the virtual camera based on the setting state of the virtual camera which has been stored in association with the notification subject situation.

8. A non-transitory computer-readable information storage medium storing a program, the program causing a computer to function as a game device for executing a game,
  the program further causing the computer to function as:
  a display control section for displaying, on a game screen, a whole or a part of a game space in which a plurality of objects are located;
  an update section for updating a location state of the plurality of objects;
  a notification subject situation saving section for storing, as a notification subject situation, the location state of the plurality of objects at a previous given time point during a practice mode in a notification subject situation storage; and
  a notification control section for executing notification output during a normal mode based on a result of comparison between the location state of the plurality of objects in the normal mode and the notification subject situation that is stored during the practice mode, so as to provide an indication of a current game situation that is similar or identical to the notification subject situation that is stored during the practice mode,
  wherein the display control section displays the game screen showing a situation of the game space, which is viewed from a virtual camera, on a display unit;
  the notification subject situation saving section comprises a section for storing, in association with the notification subject situation, a setting state of the virtual camera at the previous given time point in a storage; and
  the display control section comprises a section for changing, in a case where the result of the comparison between the location state of the plurality of objects and the notification subject situation is a predetermined result, a setting state of the virtual camera based on the setting state of the virtual camera which has been stored in association with the notification subject situation.

9. A method of controlling a game device for executing a game comprising a processor and a display, comprising:
  a display control step of displaying, on a game screen in the display, a whole or a part of a game space in which a plurality of objects are located;
  an update step of updating by the processor a location state of the plurality of objects;
  a notification subject situation saving step of storing, as a notification subject situation, the location state of the plurality of objects at a previous given time point in a storage; and a notification control step of executing notification output in the processor based on a result of comparison between the location state of the plurality of objects and the notification subject situation, wherein the notification control step comprises:

acquiring a degree of similarity between the location state of the plurality of objects and the notification subject situation; and executing the notification output based on the degree of similarity, wherein the notification output by the notification control step comprises controlling a distance from a field object to a virtual camera object to increase in accordance with an increase in a degree of similarity between the current game situation and the notification subject situation.

10. A non-transitory computer-readable information storage medium storing a program, the program causing a computer to function as a game device for executing a game, the program further causing the computer to function as:

a display control section for displaying, on a game screen, a whole or a part of a game space in which a plurality of objects are located;

an update section for updating a location state of the plurality of objects;

a notification subject situation saving section for storing, as a notification subject situation, the location state of the plurality of objects at a previous given time point in a notification subject situation storage; and a notification control section for executing notification output based on a result of comparison between the location state of the plurality of objects and the notification subject situation, wherein the notification control section comprises:

a section for acquiring a degree of similarity between the location state of the plurality of objects and the notification subject situation; and a section for executing the notification output based on the degree of similarity, wherein the notification output by the notification control section comprises controlling a distance from a field object to a virtual camera object to increase in accordance with an increase in the degree of similarity.

* * * * *